Aug. 24, 1954 W. HERING 2,687,373
PROCESS FOR THE PRODUCTION OF A METAL OFFSET PRINTING PLATE
Filed Aug. 21, 1948
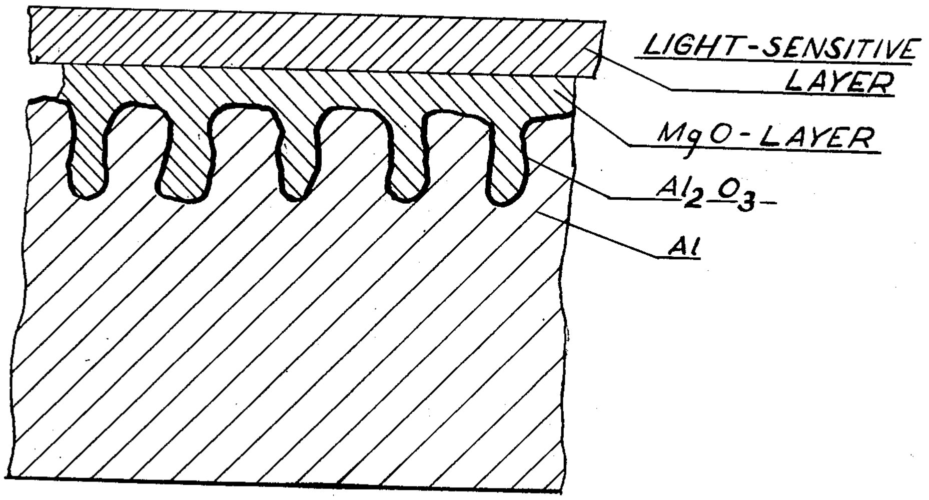
INVENTOR
WILLY HERING
BY Toulmin & Toulmin
ATTORNEYS Patented Aug. 24, 1954

2,687,373

UNITED STATES PATENT OFFICE 2,687,373

PROCESS FOR THE PRODUCTION OF A METAL OFFSET PRINTING PLATE

Willy Hering, Mettlach, France, assignor to Cris Trust, Vaduz, Liechtenstein

Application August 21, 1948, Serial No. 45,556

4 Claims. (Cl. 204—38)

It is already known to prepare metal plates consisting of zinc or aluminium and the alloys of the same, electrolytically, by means of direct current or alternating current for flat and offset printing.

The printing plates made according to this known process were not entirely satisfactory for flat and offset printing, as they have several disadvantages, so that they were not widely employed in practice in technical circles.

Substantially two disadvantages predominate:

(a) The printing plate surfaces produced electrolytically according to the different Eloxal processes were certainly resistant to corrosion, but they were not sufficiently porous and therefore absorbed too little rubber, moisture and printing ink, and thus did not fulfil the requirements for use as flat and offset printing plates which require to be highly absorbent for rubber, water and ink.

(b) If for attaining porous layers by electrolytic treatment, alternating current of low voltage, were used, then certainly sufficient porosity for absorption of rubber was attained, also moisture and printing ink, but it turned out in practice that the printing plates thus produced were particularly subject to corrosion and oxidation. The surface layer of the plates deteriorated very soon. Use of the plates thus made turned out to be impossible.

By the use of the process hereinafter described to which this invention relates, not only are the disadvantages inherent in the previously known electrolytically treated metal printing plates overcome, but a completely new type of metal printing plate for flat and offset printing is obtained having all the predominating qualities of the Solnhof natural stone and even in some respects better qualities.

(1) After the treatment mentioned under (b), of the metal plates for attaining a surface layer which is sufficiently porous for the purposes of flat or offset printing, there remain in the deeply ramified pores of the surface of the plate, residues of acids from the chemical-electrolytic bath. Those acid residues continue to be active and after a short time lead to the destruction of the plate surface. In order to remove these residues of acid thoroughly, simple washing was not sufficient but it was necessary to subject the plates to further treatment by a neutralisation bath.

*Example*

Dipping process at least five minutes in a solution of ½% ammonia liquid ($NH_4OH$) specific gravity 0.96=16° Bé. at normal temperature.

This process removes the acid residues; the cause of rapid destruction of the plate surface is thereby removed; at the same time a limited storage capacity is obtained, for these metal plates.

However, in the case of fairly long storage, oxidation and corrosion phenomena show themselves in the metal printing plates treated in the neutralization bath. If the electrolytically treated metal printing plates are furnished with a light-sensitive layer capable of being used for copying, then acceleration of the decomposition occurs because this light-sensitive layer absorbs the atmospheric moisture very readily. Then this moisture acts on the plate surface and causes its decomposition.

(2) To protect the print layer of the metal plates against the destructive influences of moisture, it is necessary to close the open pores of the plate surface and to combine the filling materials to be used in such manner that upon the development of the light-sensitive layer, that is, when the support is positioned, the pore filling materials may be readily removed from the pores so that the support materials may be anchored in the now open pores. This is attained by pigmentation with the use of a volatile suspending liquid.

The suspension of the pigment or inorganic filler substances is poured onto the porous surface of the neutralized plate. The suspending liquid volatilizes. The pores of the plates are filled by the pigment or inorganic filler materials, which also form a layer over the porous surface. The pigment substances offer resistance to atmospheric moisture. Thus adequate corrosion resistance of the surface of the plate is attained.

*Example*

1 kg. calcined magnesia MgO, sufficient for about 50 sq. m. of plates is agitated in 1,000 kg. carbon tetrachloride $CCl_4$ or ethylene trichloride $C_2HCl_3$. The mixture is constantly stirred by a pump device so that uniform distribution of the magnesia may take place in use.

*Normal temperature*

The metal plates are submerged for 15 minutes and then are dried in a heating cupboard provided with ventilation, at a temperature up to 30 deg. C.

(3) If now the metal printing plates, which have become sufficiently corrosion-resistant through this process, are furnished with a light-sensitive layer capable of copying, then through hygroscopical properties of this layer no oxidation or corrosion of the surface of the plate can be brought about any longer, at least not within a period of time of a few months, which in general is fully adequate as storage time for printing purposes.

An offset printing plate prepared in accordance with the invention is shown greatly enlarged in the accompanying drawing in which the single figure represents an aluminum plate anodized in an acid bath and having a porous layer of aluminum oxide at the surface thereof. As shown the pores are filled with magnesium oxide which also forms a layer between the pores and the top layer of light sensitive material. It will be understood by those skilled in the art that the surface of the base plate can be roughened and rendered porous, as by etching in an acid electrolyte.

In the use of metal plates for printing of this type thus treated, there takes place after the copying, upon the development of the light-sensitive layer, the opening of the pores at those places which serve as support, this is effected merely by tap water through the medium of a fine jet of water under a low pressure, and by careful wiping over with cotton wool for the perfect removal of the pigment materials, until the pure white drawing is visible. These open pores during the process of printing then absorb an increased amount of moisture and printing ink.

The particular characteristics of the process are:

(1) The neutralization bath according to the example and (2) The pigmentation with the use of volatile halides of the vertical series 4 of the periodic table of elements with the addition of pigment according to the example.

(3) In combination with the provision of a light-sensitive layer capable of copying and of being stored, the offset printer has available a metal printing plate ready for use which he can employ like, for instance, a photograph over a manufactured photo plate. All the previous time-wasting, cumbersome and costly preparation work before the copying of prints are eliminated in this new offset printing plate.

Having now particularly described and ascertained the nature of my said invention, and in what manner the same is to be performed, I declare that what I claim is:

1. The process of treating an aluminum sheet for use in an offset printing process which comprises electrolytically treating the surface of the sheet with an alternating current of low voltage to obtain a porous aluminum oxide surface layer thereon, treating the sheet with an ammonium hydroxide solution to neutralize residual acid present therein, treating the neutralized plate with a volatile organic solvent dispersion of magnesium oxide to close the pores of the aluminum oxide surface layer by deposition of the magnesium oxide therein, and evaporating the volatile solvent.

2. The product of the process of claim 1.

3. The process according to claim 1 characterized in that the volatile organic solvent in which the magnesium oxide is dispersed is carbon tetrachloride.

4. The process according to claim 1 characterized in that the volatile organic solvent in which the magnesium oxide is dispersed is ethylene trichloride.

References Cited in the file of this patent

UNITED STATES PATENTS

| Number | Name | Date |
|---|---|---|
| 590,966 | Cornwall | Oct. 5, 1897 |
| 637,588 | Hett | Nov. 21, 1899 |
| 1,252,800 | Hain | Jan. 8, 1918 |
| 1,773,160 | Anderson et al. | Aug. 19, 1930 |
| 1,785,606 | Zwickau | Dec. 16, 1930 |
| 2,056,386 | Cambron | Oct. 6, 1936 |
| 2,078,790 | Bucy | Apr. 27, 1937 |
| 2,115,339 | Mason | Apr. 26, 1938 |
| 2,311,888 | Toland | Feb. 23, 1943 |
| 2,312,854 | Toland et al. | Mar. 2, 1943 |
| 2,344,510 | Hagelin | Mar. 21, 1944 |
| 2,364,436 | Frisch et al. | Dec. 5, 1944 |

FOREIGN PATENTS

| Number | Country | Date |
|---|---|---|
| 378,521 | Great Britain | Aug. 15, 1932 |
| 467,024 | Great Britain | Sept. 11, 1936 |

OTHER REFERENCES

Mellor's "Treatise On Inorganic and Theoretical Chemistry," vol. 5 (1924), page 212.